United States Patent
Nishioka

(10) Patent No.: US 9,574,904 B2
(45) Date of Patent: Feb. 21, 2017

(54) ROTATIONAL ANGLE DETECTOR INCLUDING SEAT AND ROTARY MACHINE INCLUDING THE DETECTOR

(71) Applicant: FANUC CORPORATION, Minamitsuru-gun, Yamanashi (JP)

(72) Inventor: Akira Nishioka, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 59 days.

(21) Appl. No.: 14/626,141

(22) Filed: Feb. 19, 2015

(65) Prior Publication Data

US 2015/0241247 A1 Aug. 27, 2015

(30) Foreign Application Priority Data

Feb. 24, 2014 (JP) ................................. 2014-033141

(51) Int. Cl.
*G01D 5/12* (2006.01)
*H02K 1/18* (2006.01)
*G01D 5/244* (2006.01)

(52) U.S. Cl.
CPC ............ *G01D 5/12* (2013.01); *G01D 5/24442* (2013.01); *H02K 1/18* (2013.01); *H02K 1/185* (2013.01); *H02K 11/21* (2016.01)

(58) Field of Classification Search
CPC ........ G01D 5/24442; G01D 5/14; H02K 1/18; H02K 1/185
See application file for complete search history.

(56) References Cited

U.S. PATENT DOCUMENTS

2007/0144594 A1* 6/2007 Moon ................... F16K 11/074
137/625.46

FOREIGN PATENT DOCUMENTS

| JP | 62-149258 | 9/1987 |
|---|---|---|
| JP | 3-60002 | 6/1991 |
| JP | 3-65913 | 6/1991 |
| JP | 2006-010436 | 1/2006 |
| WO | WO 00/05548 | 2/2000 |

* cited by examiner

*Primary Examiner* — David Gray
*Assistant Examiner* — Michael Harrison
(74) *Attorney, Agent, or Firm* — RatnerPrestia

(57) ABSTRACT

A rotational angle detector includes a rotary element rotatable around a rotational axis line, the rotary element having a detected portion on an outer circumference, a detection element provided on a radially outside of the detected portion so as to face the detected portion, and a seat having a mounting surface on which the detection element can be mounted, the mounting surface extending around the rotational axis line. The seat is configured such that a distance between the mounting surface and the detected portion in a direction parallel to the rotational axis line varies along a circumferential direction of the seat.

7 Claims, 5 Drawing Sheets

ROTATIONAL ANGLE DETECTOR INCLUDING SEAT AND ROTARY MACHINE INCLUDING THE DETECTOR

BACKGROUND OF THE INVENTION

1. Field of the Invention

The present invention relates to a rotational angle detector for detecting a rotational angle of a rotary element and a rotary machine including a rotational angle detector.

2. Description of the Related Art

A rotational angle detector is used to detect a rotational angle of a rotary machine such as an electric motor, or a rotational angle of a rotary element driven by a rotary machine. For example, JP 2006-010436 A discloses a magnetic rotational angle detector which includes a magnetic sensor for detecting the magnitude of a magnetic field varying in response to the rotational angel of a rotary element. This type of rotational angle detector includes a detected portion in the form of a gear provided on an outer circumferential face of the rotary element, and a magnetic sensor provided so as to be opposite to the detected portion.

FIG. 7 is a perspective view illustrating a rotational angle detector 100 according to related art. The rotational angle detector 100 includes a cylindrical rotary element 104 fixed to a rotational axis 102 rotatable around a rotational axis line 102a, and a detection element 108 fixed to a cylindrical seat 106. The rotary element 104 has a detected portion 104a on an outer circumferential face. The detection element 108 is positioned so as to be opposite to and close enough to the detected portion 104a of the rotary element 104.

In magnetic rotational angle detector, such as disclosed in JP 2006-010436 A, detection accuracy may be decreased when the positional relationship between the magnetic sensor incorporated in the detection element 108 and the detected portion 104a of the rotary element 104 is changed. Therefore, it is necessary to ensure that the detection element 108 is in a predetermined position relative to the detected portion 104a.

However, the position of the detection element 108 relative to the rotary element 104 may be changed, due to accumulated dimensional tolerances of the rotational axis 102, the rotary element 104, the seat 106 and other structures, which are not shown in the drawing, or an assembly error. Therefore, as shown in FIG. 7, a spacer 110 is provided between the detection element 108 and a mounting surface 106a of the seat 106 in order to adjust the position of the detection element 108 relative to the detected portion 104a in a direction parallel to the rotational axis line 102a.

FIG. 8 is a perspective view illustrating a rotational angle detector 100 according to another related art. In this related art, a seat 106' having a larger thickness is used, instead of the spacer 110. For comparison, the position of the mounting surface 106a of the seat 106 having a thickness T1 as shown in FIG. 7 is shown by dashed line. The seat 106' has a larger thickness T2 than the thickness T1. As a result, the mounting surface 106a' of the seat 106' and the detection element 108 fixed on the mounting surface 106a' are at a higher position by the difference in thicknesses. By selectively adopting a plurality of seats having different thicknesses from one another, the position of the detection element 108 relative to the detected portion 104a in a direction parallel to the rotational axis line 102a can be adjusted.

However, according to these methods, in which spacers or seats having different thicknesses are selectively used to adjust the position of the detection element, it is necessary to prepare a plurality of different spaces or seats for assembly of the rotary machine. In addition, since a different spacer or seat may be required every time the rotary machine or the rotational angle detector is disassembled for repair and inspection, operational efficiency is decreased. Further, the management cost of parts is increased.

Therefore, there is a need for a rotational angle detector which ensures a predetermined positional relationship between the detected portion and the detection element, without a plurality of different spacers or seats.

SUMMARY OF THE INVENTION

According to a first aspect of the invention, a rotational angle detector comprising: a rotary element rotatable around a rotational axis line, the rotary element having a detected portion on an outer circumference thereof; a detection element provided on a radially outside of the detected portion so as to face the detected portion; and a seat having a mounting surface on which the detection element can be mounted, the mounting surface extending around the rotational axis line, wherein the seat is configured such that a distance between the mounting surface and the detected portion in a direction parallel to the rotational axis line varies along a circumferential direction of the seat, is provided.

According to a second aspect of the invention, in the rotational angle detector according to the first aspect, the mounting surface of the seat has a plurality of stepped portions such that the distance between the mounting surface and the detected portion in the direction parallel to the rotational axis line varies along the circumferential direction of the seat in a stepwise manner.

According to a third aspect of the invention, in the rotational angle detector according to the first aspect, the mounting surface of the seat is slanted such that the distance between the mounting surface and the detected portion in the direction parallel to the rotational axis line varies continuously along the circumferential direction of the seat.

According to a fourth aspect of the invention, in the rotational angle detector according to the third aspect, the detection element has a supplementary shape to the mounting surface of the seat being slanted.

According to a fifth aspect of the invention, in the rotational angle detector according to any of the first to fourth aspects, the seat is configured such that a distance between a surface opposite of the mounting surface and the detected portion in the direction parallel to the rotational axis line varies along the circumferential direction of the seat.

According to a sixth aspect of the invention, in the rotational angle detector according to any of the first to fifth aspects, the seat has an inner diameter larger than an outer diameter of the rotary element.

According to a seventh aspect of the invention, a rotary machine comprising the rotational angle detector according to any of the first to sixth aspects is provided.

These and other objects, features and advantages of the present invention will become more apparent in light of the detailed description of exemplary embodiments thereof as illustrated by the drawings.

DETAILED DESCRIPTION OF THE INVENTION

Embodiments of the present invention will be described with reference to the accompanying drawings. The illustrated constituent elements may be modified in size as necessary for better understanding of the present invention.

Figure 1A:
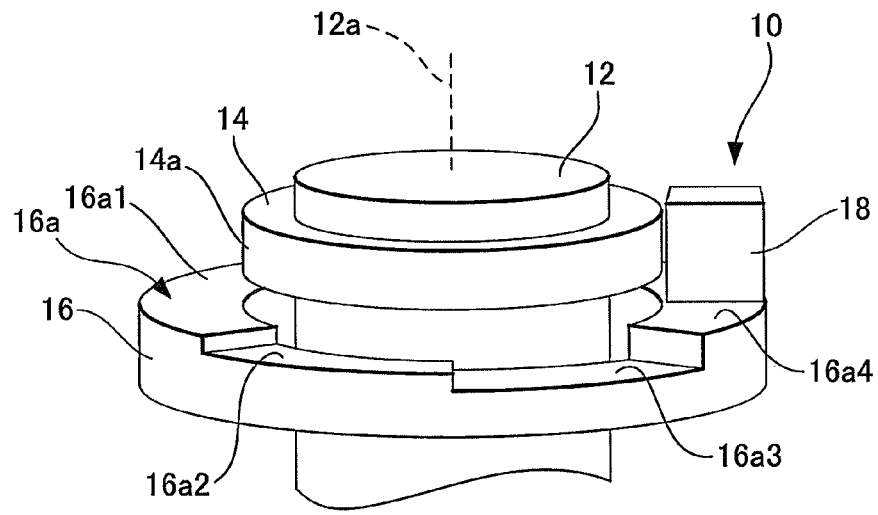
FIG. 1A is a perspective view illustrating a rotational angle detector according to a first embodiment.

FIG. 1A is a perspective view illustrating a rotational angle detector 10 according to a first embodiment. The rotational angle detector 10 includes a rotational axis 12 rotatable around a rotational axis line 12a, a cylindrical rotary element 14 attached to an outer circumference of the rotational axis 12, a cylindrical seat provided concentrically with the rotational axis 12 and the rotary element 14, and a detection element 18 mounted on the seat 16 on a radially outer side of the rotary element 14.

The rotational axis 12 is coupled to an output axis of a rotary machine, e.g., an electric motor, and rotated with power generated by the electric motor. A speed reducer may be interposed between the rotational axis 12 and the output axis of the rotary machine. Alternatively, the rotational axis 12 may be an output axis of the rotary machine.

The rotary element 14 is provided with a detected portion 14a on an outer circumferential face. The detected portion 14a is, for example, formed from a plurality of convex portions (not shown) protruding from the outer circumference face of the rotary element 14 toward a radially outside. The detected portion 14a and the detection element 18 have known configurations, for example, as disclosed in JP 2006-010436 A, and the detailed description thereon will be omitted herein.

The detection element 18 is positioned on a radially outside of the detected portion 14a of the rotary element 14 so as to face the detected portion 14a. The detection element 18 may be a known magnetic encoder including a magnetic sensor, for example, but is not limited thereto. The detection element 18 is fixed on a mounting surface 16a of the seat 16 extending around the rotational axis line 12a. The seat 16 is, for example, fixed to a housing part of the rotational angle detector 10 and therefore, the rotational axis 12 and the rotary element 14 can be rotated relative to the seat 16 and the detection element 18.

In the present embodiment, a plurality of stepped portions are formed on the mounting surface 16a of the seat 16 in a circumferential direction. As a result, the distance between the mounting surface 16a of the seat 16 and the detected portion 14a defined in a direction parallel to the rotational axis line 12a (hereinafter simply referred to as "axial direction") varies along the circumferential direction of the seat 16 in a stepwise manner. In FIG. 1A, a first stepped portion 16a1, a second stepped portion 16a2, a third stepped portion 16a3, and a fourth stepped portion 16a4 of the mounting surface 16a can be seen. Stepped portions are also formed on a portion behind the rotational axis 12 and the rotary element 14, but cannot be seen in the drawing. The mounting surface 16a may have more stepped portions or less stepped portions than the illustrated particular example. The respective stepped portions formed on the mounting surface 16a are designed to extend over areas large enough that the detection element 18 can be mounted thereon, but the stepped portions may extend over areas different from one another.

Figure 1B:
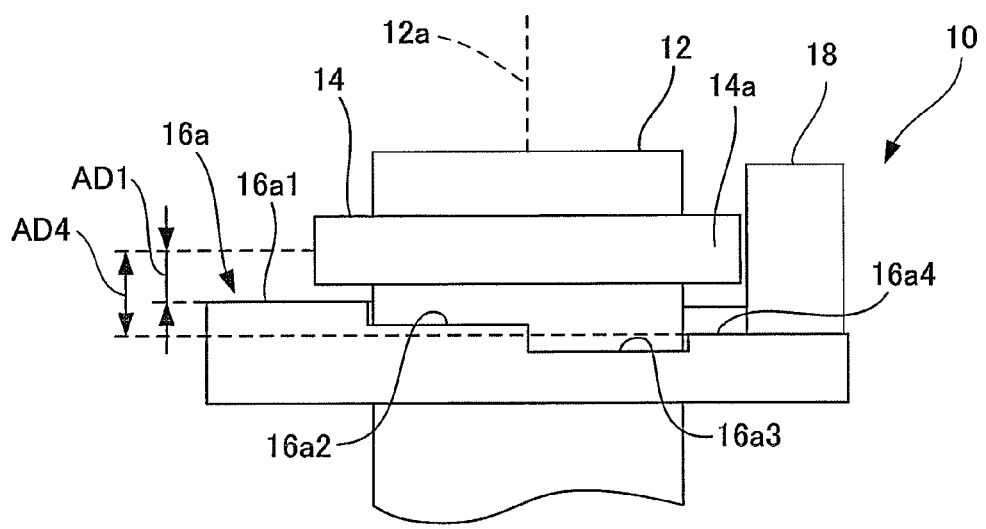
FIG. 1B is a side view illustrating the rotational angle detector of FIG. 1A.

FIG. 1B is a side view illustrating the rotational angle detector 10 of FIG. 1A. As apparent from FIG. 1B, the axial distances between the detected portion 14a and the first, second, third and fourth stepped portions 16a1, 16a2, 16a3, and 16a4 are different from one another in a stepwise manner. Referring to FIG. 1B, for example, the axial distance AD1 between the first stepped portion 16a1 and the detected portion 14a, and the axial direction AD4 between the fourth stepped portion 16a4 and the detected portion 14 are shown, respectively.

According to this embodiment, the detected portion 14a and the detection element 18 can be aligned relative to each other in the axial direction by selectively attaching the detection element 18 to one of the stepped portions formed on the mounting surface 16a of the seat 16. As a result, the position of the detection element 18 can be adjusted relative to the detected portion 14a, without a need for a plurality of seats or spacers of different sizes. This allows the maintenance and managing cost of the rotational angle detector to be reduced. In addition, the assembly of the detection element 18 can be simplified, allowing the manufacturing cost to be reduced. Further, the position adjustment of the detection element 18 can be facilitated in the case where the seat 16 and the detection element 18 are reassembled after detached from the rotational angle detector for the purpose of repair or inspection, thereby improving the productivity.

Other embodiments will be described below. In the following explanation, the matters which have already been described may be omitted as necessary. The same or corresponding constituent elements are assigned with the same referential numerals.

Figure 2:
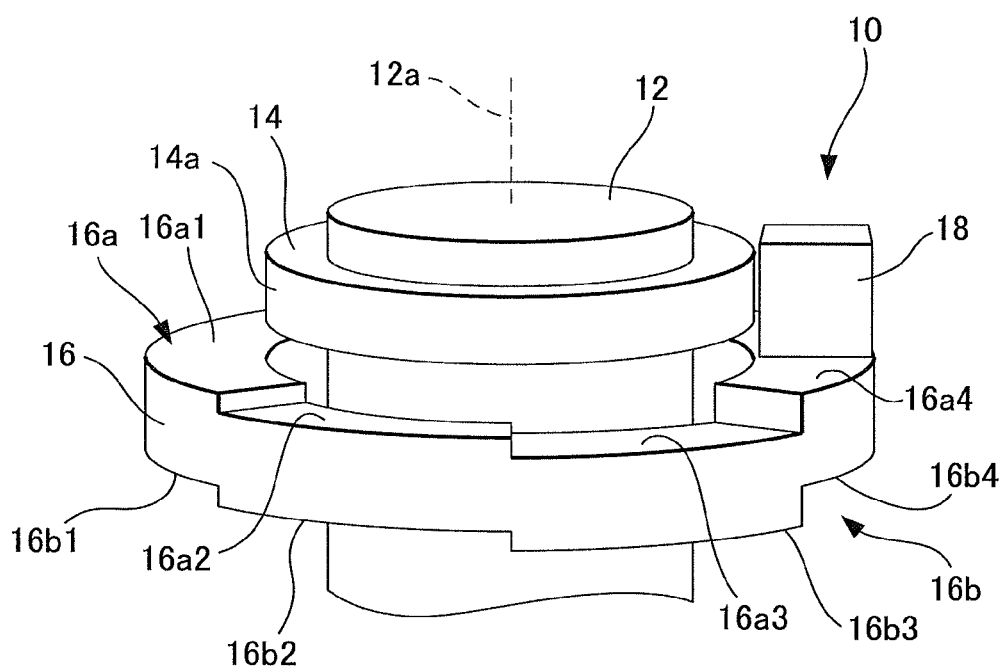
FIG. 2 is a perspective view illustrating a rotational angle detector according to a second embodiment.

FIG. 2 is a perspective view illustrating a rotational angle detector 10 according to a second embodiment. In the present embodiment, in addition to the stepped portions on the mounting surface 16a, a plurality of stepped portions are formed on a bottom surface 16b of the seat 16 opposite of the mounting surface 16a (only stepped portions 16b1 to 16b4 can be seen in the drawing). The step between the stepped portions of the bottom surface 16b is different from that of the mounting surface 16a. Therefore, if the seat 16 is turned around, the axial distances between the respective stepped portions of the bottom surface 16b and the detected portion 14a are different from those between the stepped portions on the mounting surface 16a and the detected portion 14a. In this way, in the case of the seat 16 in which the stepped portions are formed on both of the end surfaces 16a and 16b, the axial position of the detection element 18 relative to the detected portion 14a can be further changed by using the seat 16 upside down. As a result, the detection element 18 can be positioned at more axial positions different from one another, by using the same seat 16. Therefore, the position adjustment effect of the detection element 18 by the seat 16 can be enhanced.

Figure 3A:
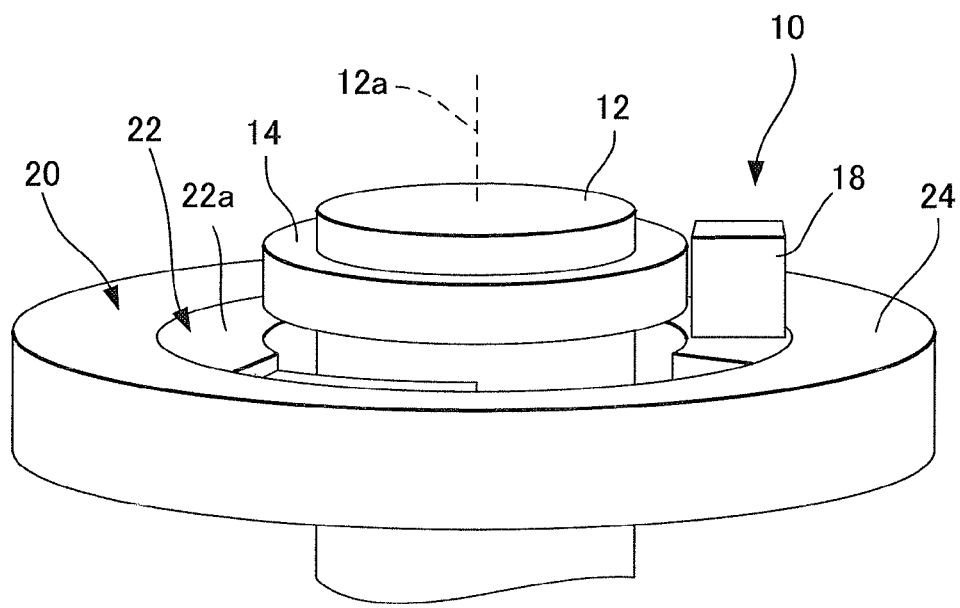
FIG. 3A is a perspective view illustrating a rotational angle detector according to a third embodiment.
Figure 3B:
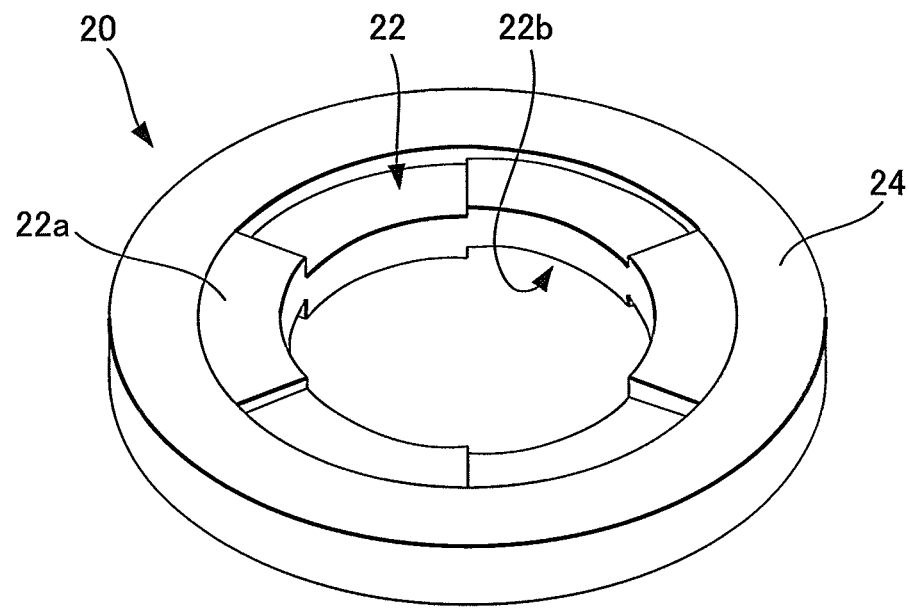
FIG. 3B is a perspective view illustrating a seat of the rotational angle detector shown in FIG. 3A.

FIG. 3 is a perspective view illustrating a rotational angle detector 10 according to a third embodiment. FIG. 3B is a perspective view illustrating a seat 20 of the rotational angle detector 10 shown in FIG. 3A. In this embodiment, the seat 16 includes a cylindrical mounting portion 22 having a mounting surface 22a provided with a plurality of stepped portions, and a cylindrical attachment portion 24 extending on a radially outside from the mounting portion 22 and fixed to a support, such as a housing part. In the illustrated example, the stepped portions are formed on both of the end surfaces 22a and 22b of the mounting portion 22. However, the stepped portions may be alternatively formed on only one of the end surfaces serving as the mounting surface 22a, as described above with reference to FIGS. 1A and 1B. According to this embodiment, the position of the detection element 18 can be adjusted in the axial direction, without changing the thickness of the seat 20.

Figure 4:
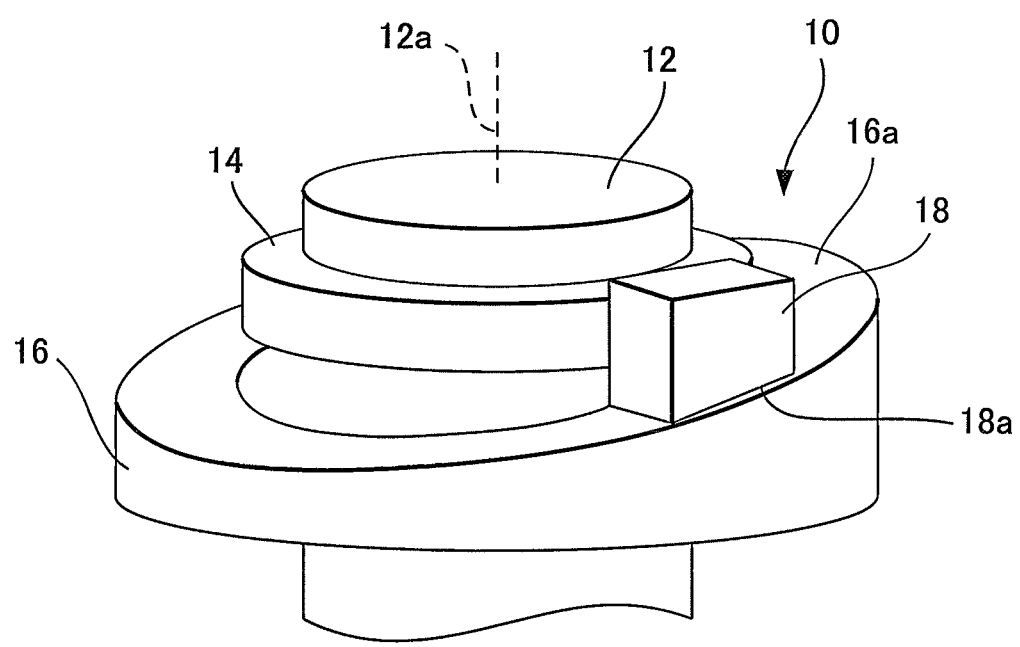
FIG. 4 is a perspective view illustrating a rotational angle detector according to a fourth embodiment.

FIG. 4 is a perspective view illustrating a rotational angle detector 10 according to a fourth embodiment. In this embodiment, the mounting surface 16a of the seat 16 is slanted relative to a plane perpendicular to the rotational axis line 12a. In this case, the axial distance between the mounting surface 16a and the detected portion 14a varies continuously along the circumferential direction of the seat 16. The detection element 18 has an opposite face 18a which faces the mounting surface 16a and has a complementary shape to the slant of the mounting surface 16a. This configuration allows the axial position at which the detection element 18 is disposed to be more precisely adjusted by shifting the attachment position of the detection element 18 in the circumferential direction. Unlike the illustrated example, the mounting surface 16a may be slanted only partially in the circumferential direction, and the remaining of the mounting surface 16a may be flat. Although the slant of the mounting surface 16a is constant in the illustrated example, the present invention is not limited to such an exemplary configuration.

Figure 5:
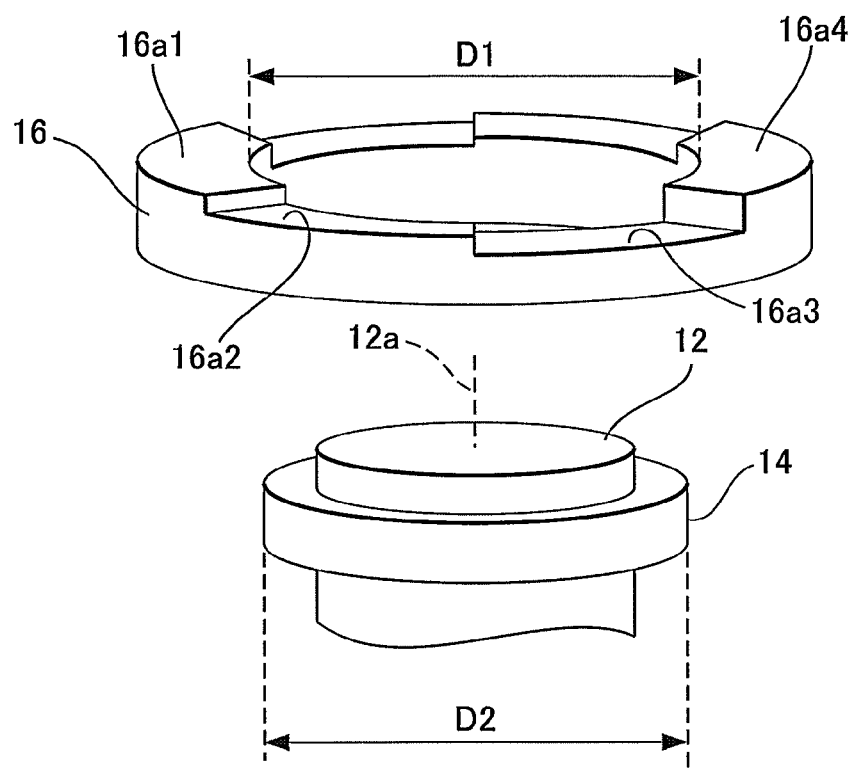
FIG. 5 is an exploded perspective view illustrating a rotational angle detector according to a fifth embodiment.

FIG. 5 is an exploded perspective view illustrating a rotational angle detector 10 according to a fifth embodiment. In this embodiment, the respective constituent elements are sized such that the inner diameter D1 of the seat 16 is greater than the outer diameter D2 of the rotary element 14. According to this embodiment, the seat 16 can be easily attached to and detached from the rotational angle detector 10, without the rotary element 14 being detached from the rotational axis 12. In addition, in the case where the seat is provided with stepped portions on both of the end faces, this configuration has an effect of facilitating a process of assembling the seat 16 upside down.

Figure 6:
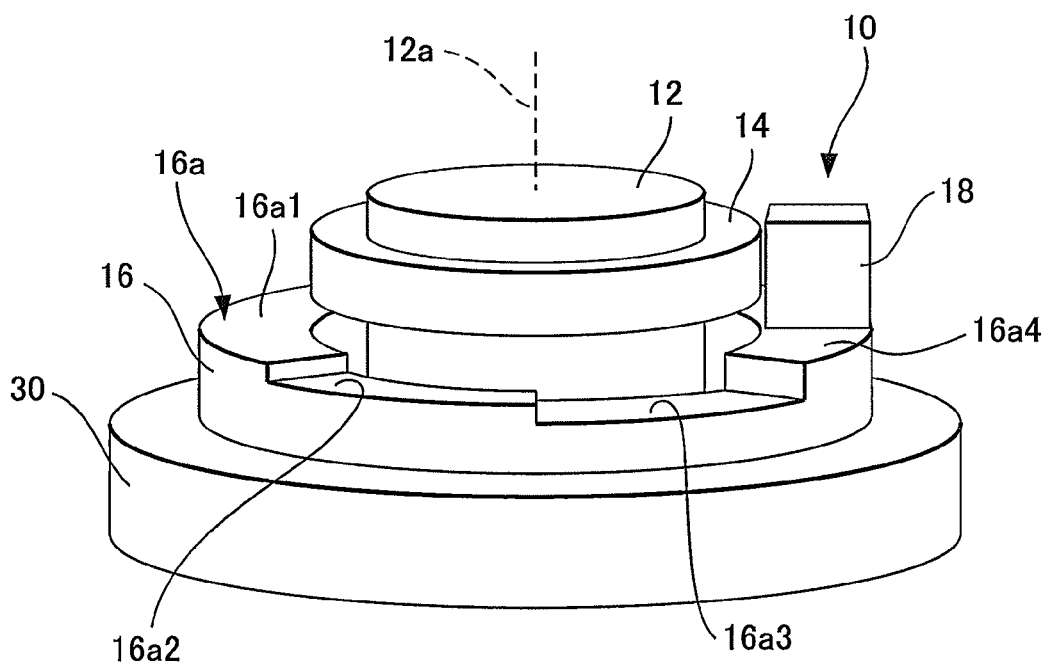
FIG. 6 is a perspective view illustrating an example in which the rotational angle detector according to the first embodiment is applied to a rotary machine.
Figure 7:
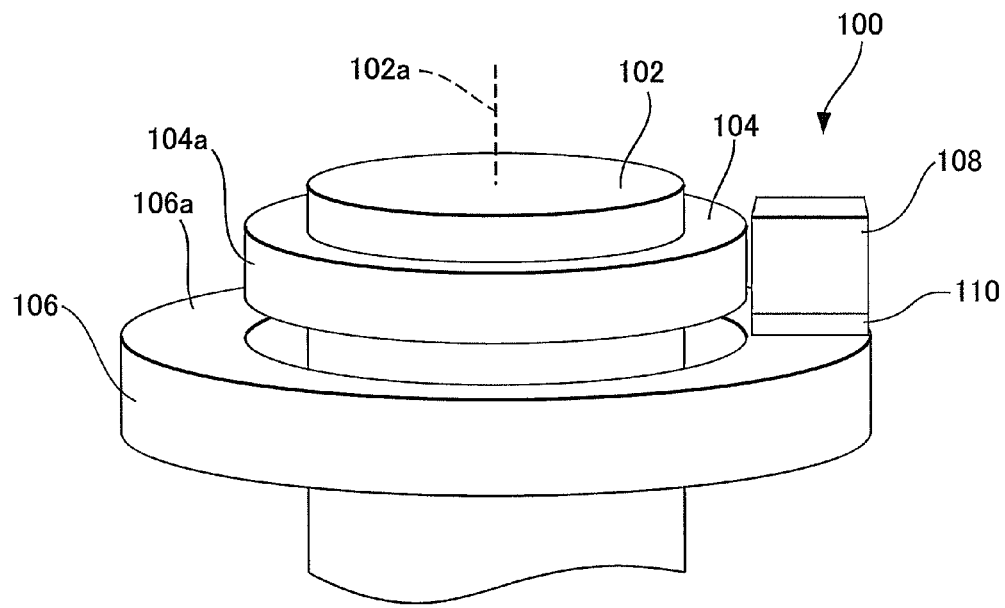
FIG. 7 is a perspective view illustrating a rotational angle detector according to related art.
Figure 8:
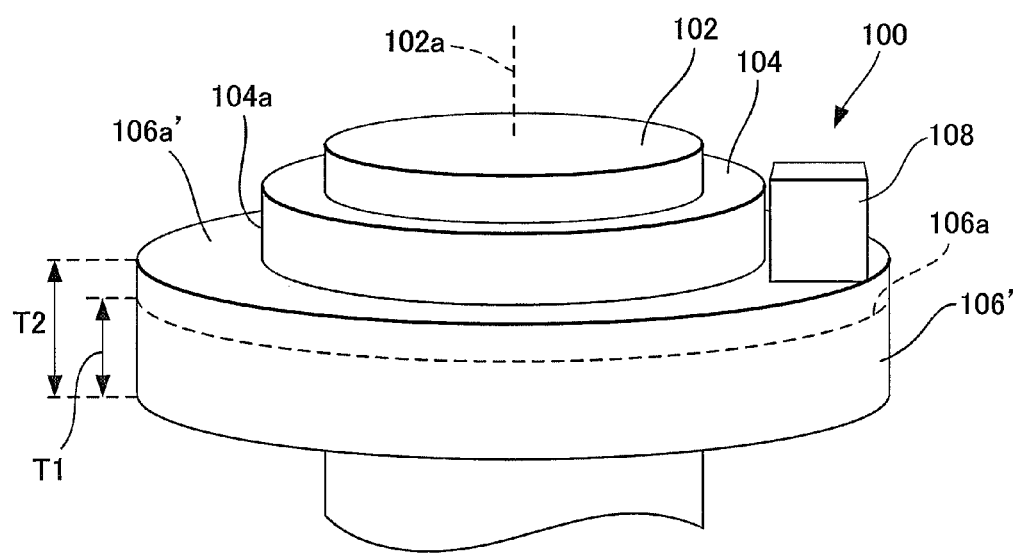
FIG. 8 is a perspective illustrating a rotational angle detector according to another related art.

FIG. 6 is a perspective view illustrating an example in which the rotational angle detector 10 according to the present invention to a rotary machine. As illustrated, the seat 16 is fixed to a support 30 on the stator side of the rotary machine, which is not shown. The seat 16 may be fixed to the support 30 by known means, such as screws or adhesives. For example, the support 30 may be fixed to a housing of the rotary machine. With the aid of such a support 30, the seat can be attached to the rotary machine, without modifying the configuration of the rotary machine. Although the illustrated example adopts the rotational angle detector 10 according to the first embodiment, a person skilled in the art will understand that the rotational angle detector according to other embodiments may also be applied to a rotary machine in the same manner.

Effect of the Invention

According to the rotational angle detector and the rotary machine having the configurations as described above, the position of the detection element can be adjusted relative to the detected portion by changing the attachment position of the detection element in a circumferential direction of the seat. Accordingly, it is not necessary to prepare a plurality of different spacers or seats. This simplifies the management of the parts and the maintenance and managing cost can be reduced. In addition, since the assembly of the rotational angle detector is simplified, the manufacturing cost can be reduced. Further, it is easy to adjust the position of the detection element after the assembly as necessary.

Although the various embodiments and modifications of the present invention have been described above, it is apparent to those skilled in the art that other embodiments and modifications may also provide the functions and effects intended by the present invention. In particular, one or more of the constituent elements of the embodiments and modifications described above may be omitted or replaced or any known means may further be added, without departing from the scope of the present invention. It is also apparent to those skilled in the art that the present invention may also be performed by any combination of the features of the different embodiments explicitly or implicitly disclosed in the present specification.

What is claimed is:

1. A rotational angle detector comprising:
   a rotary element rotatable around a rotational axis line, the rotary element having a detected portion on an outer circumference thereof;
   a detection element provided radially outward of the detected portion so as to face the detected portion; and
   a seat having a mounting surface on which the detection element can be mounted, the mounting surface extending around the rotational axis line,
   wherein the seat is configured such that a distance between the mounting surface and the detected portion in a direction parallel to the rotational axis line varies along a circumferential direction of the seat.

2. The rotational angle detector according to claim 1, wherein the mounting surface of the seat has a plurality of stepped portions such that the distance between the mounting surface and the detected portion in the direction parallel to the rotational axis line varies along the circumferential direction of the seat in a stepwise manner.

3. The rotational angle detector according to claim 1, wherein the mounting surface of the seat is slanted such that the distance between the mounting surface and the detected portion in the direction parallel to the rotational axis line varies continuously along the circumferential direction of the seat.

4. The rotational angle detector according to claim 3, wherein the detection element has an opposite face which faces the mounting surface of the seat and is slanted correspondingly to the slant of the mounting surface of the seat.

5. The rotational angle detector according to claim 1, wherein the seat is configured such that a distance between a surface opposite of the mounting surface and the detected portion in the direction parallel to the rotational axis line varies along the circumferential direction of the seat.

6. The rotational angle detector according to claim 1, wherein the seat has an inner diameter larger than an outer diameter of the rotary element.

7. A rotary machine comprising the rotational angle detector according to claim 1.

* * * * *